United States Patent
Nzudie et al.

(10) Patent No.: US 6,774,176 B1
(45) Date of Patent: Aug. 10, 2004

(54) POLYMERS FLUORINATED BY POLYMERIZATION IN MINI-EMULSION

(75) Inventors: Dennis Tembou Nzudie, Serquigny (FR); Didier Juhue, Levallois-Perret (FR); Jean-Marc Corpart, Sannois (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/831,575

(22) PCT Filed: Nov. 9, 1999

(86) PCT No.: PCT/FR99/02744

§ 371 (c)(1),
(2), (4) Date: Aug. 14, 2001

(87) PCT Pub. No.: WO00/29457

PCT Pub. Date: May 25, 2000

(30) Foreign Application Priority Data

Nov. 13, 1998 (FR) .............................. 98 14272

(51) Int. Cl.$^7$ ................................ C08L 27/12
(52) U.S. Cl. ................. 524/544; 524/545; 524/546; 427/372.2; 427/385.5; 427/389; 427/389.9
(58) Field of Search ................. 427/372.2, 385.5, 427/389, 389.9; 524/544

(56) References Cited

U.S. PATENT DOCUMENTS 3,462,296 A    8/1969  Raynolds et al.

FOREIGN PATENT DOCUMENTS

| | | |
|---|---|---|
| DE | 14 19 505 | 1/1969 |
| EP | 0 511 539 | 11/1992 |
| EP | 0 182 516 | 5/1996 |
| FR | 1 532 053 | 7/1967 |
| FR | 2 175 332 | 10/1973 |
| FR | 2 202 515 | 5/1974 |
| GB | 933512 | * 8/1963 |
| GB | 1 433 524 | 4/1976 |
| WO | WO 94 22928 | 10/1994 |

OTHER PUBLICATIONS

Translation of the Notification Concerning the Transmission of the International Preliminary Examination Report (PCT/PEA/416) and Translation of International Preliminary Examination Report (PCT/IPEA/409).
Japanese Abstract, Patent No. JP 60040182.

* cited by examiner

Primary Examiner—Patrick D. Niland

(57) ABSTRACT

The invention discloses a process for the preparation of fluorinated polymers by miniemulsion polymerization of a mixture of fluorinated and nonfluorinated monomers in the absence of organic solvent. This polymerization process makes it possible to obtain an aqueous emulsion of fluorinated polymers devoid of coagulum.

12 Claims, No Drawings

POLYMERS FLUORINATED BY POLYMERIZATION IN MINI-EMULSION

FIELD OF THE INVENTION

The invention relates to the field of aqueous emulsions and in particular to a process for the preparation of aqueous emulsions of fluorinated polymers.

BACKGROUND OF THE INVENTION

Fluorinated copolymers are used in various applications, in particular in the hydrophobic and oleophobic treatment of various substrates, such as textiles, leather or paper. These fluorinated copolymers are generally prepared by copolymerization in an organic solvent or according to the aqueous emulsion polymerization technique. For reasons of environmental constraints, they are generally prepared by aqueous emulsion copolymerization. For hydrophobic and oleophobic coating applications, these copolymers are obtained from at least one perfluorinated acrylic monomer and at least one nonfluorinated monomer, generally an alkyl acrylate or methacrylate.

The copolymerization of perfluorinated monomers according to the conventional emulsion technique is a technically difficult problem. This is because the strong hydrophobicity of these monomers greatly decreases, on the one hand, the contribution of the initiation of the polymerization in the aqueous phase and, on the other hand, the diffusion of these monomers from the storage drops to the growing particles. As a result of these particular properties of perfluorinated acrylic monomers, the use of a water-soluble organic solvent is necessary when they are employed in producing an aqueous emulsion. This solvent has to be a good solvent for monomers and must not cause the polymer formed to precipitate, as is the case with certain alcohols.

The most widely used solvent is acetone (see, for example, Patents FR 1,532,053 or FR 2,202,515). However, safety and transportation constraints are prompting a large number of producers to market products without a flashpoint. It is obviously possible, if the surface-active formulation has been carefully selected, to distil off the solvent used in the copolymerization.

However, this decreases the productivity and results in an additional cost with regard to energy consumption, on the one hand, and confers poor stability over time on the emulsion, on the other hand.

The use of nonflammable solvents, such as ethylene glycol, propylene glycol and their derivatives, is disclosed in Patent FR 2,175,332 but these compounds generally exhibit a poor solvating power and must be used in combination with acetone. In some commercial fluorinated emulsions, acetone has been replaced by excellent solvents with a high flashpoint, such as N-methylpyrrolidone or γ-butyrolactone. The use of heavy diols, such as dipropylene glycol, pentanediol, hexanediol and tripropylene glycol, in producing fluorinated acrylic emulsions without a flashpoint is disclosed in Patent JP 60.40182. However, it turns out that such emulsions exhibit a number of drawbacks related to the low volatility of the solvents, such as:

difficult drying of textile and leather articles, which it is impossible to bring to high temperature, and/or the lack of crosslinking of the copolymer on textiles, due to the incomplete drying of the solvent and to the presence of residual hydroxyl groups.

Whatever the solutions introduced by persons skilled in the art in terms of choice of solvent, it transpires that problems arise:

of volatile organic compounds, resulting in pollution, safety and transportation risks if the solvent cannot be distilled off, of productivity and of an additional cost with regard to energy consumption, if the formulation comprises a solvent of low boiling point which is distilled off at the end of polymerization.

Furthermore, the conventional emulsion presents a problem of stability and of yield insofar as emulsion polymerization results in the formation of a high level of coagulum (1–8%), which coagulum has to be destroyed.

DESCRIPTION OF THE INVENTION

According to the invention, the term "coagulum" is understood to mean the polymer in the form of a flock which is not stabilized and which sediments in the polymerization reactor, in contrast to the polymer present in the latex particle, which polymer is stabilized in a colloidal fashion by surfactants.

The problem which the invention seeks to solve is the development of an aqueous emulsion of fluorinated polymers which does not comprise volatile organic compounds, which is stable and which is devoid of coagulum, while observing industrial requirements such as economy in energy and productivity.

The solution has been found by virtue of a specific combination comprising 1) the use of a process known as the miniemulsion polymerization process, without the use of organic cosolvent, and 2) the judicious choice of a mixture of monomers necessarily comprising acrylamide or one of its derivatives.

The process is based on a first stage of specific emulsification of the water/monomer/surfactants mixture using an energetic means, such as ultrasound, colloid mill or high-pressure homogenizer, thus generating fine droplets of monomers in the water. The emulsification stage is followed by a polymerization stage.

The process of the invention is distinguished from conventional processes for the manufacture of perfluorinated emulsions by, on the one hand, a level of organic cosolvent in the formulation of less than 0.2% by weight of the emulsion and by, on the other hand, a level of coagulum of less than 1% by weight of the total weight of monomers. It thus exhibits the advantage of being more productive and of generating little in the way of volatile organic compound, a source of pollution.

Thus, by using the polymerization technique known as the miniemulsion polymerization technique, which technique is known in the literature for the polymerization of numerous vinyl and acrylic monomers and in particular an acrylic monomer with a longer or shorter alkyl chain, perfluorinated acrylic monomers can be copolymerized with nonfluorinated monomers, with the following advantages:

no use of organic cosolvent and therefore fewer volatile organic compounds, no loss in productivity related to distillation and no additional cost with regard to energy consumption, a higher yield, as coagulum is not formed, even at high levels of incorporation of perfluorinated monomers, no use of cosurfactant which is a fatty compound of low solubility in water (hexadecanol, hexadecane) commonly used in miniemulsions (which can disturb the final properties).

One of the subject-matters of the invention is a process for producing fluorinated polymers by miniemulsion polymerization comprising the polymerization of a mixture of monomers, which monomers are dispersed in water and which mixture is stabilized by at least one surfactant, characterized in that the level of organic cosolvent in the reaction mixture is less than 0.2% by weight of the total weight of the emulsion.

The term "fluorinated polymers" according to the invention is understood as meaning polymers comprising at least 20% by weight of units derived by polymerization of at least one fluorinated monomer.

The process of the invention is based on two stages comprising a)—the emulsification of a mixture of monomers comprising:

from 20 to 99.9% by weight of at least one monomer chosen from fluorinated (meth)acrylic monomers (A), from 0 to 65% by weight of at least one monomer chosen from nonfluorinated (meth)acrylic or vinyl monomers (B), from 0.1 to 15% by weight of at least one polar monomer (C), using energetic emulsifying means, such as ultrasound, colloid mill or high-pressure homogenizer, and b)—the polymerization of the said mixture at a temperature ranging from 20 to 100° C. using radical initiators.

The monomers A are chosen from fluorinated (meth) acrylic monomers corresponding to the following formulae:

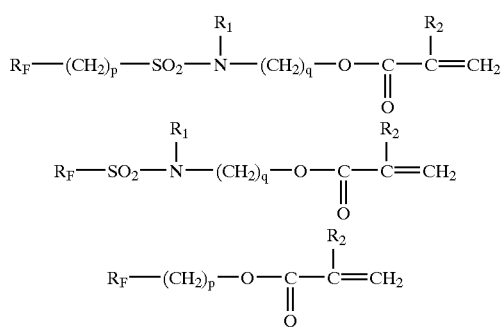

in which $R_F$ represents a perfluorinated radical with a linear or branched chain comprising 2 to 20 carbon atoms, p and q, which are identical or different, each represent an integer ranging from 1 to 20 and preferably from 1 to 4, $R_1$ represents a linear or branched alkyl radical comprising from 1 to 4 carbon atoms and $R_2$ represents a hydrogen atom or a methyl radical.

The nonfluorinated monomers (B) are generally alkyl acrylates or methacrylates, such as, for example, butyl methacrylate, 2-ethylhexyl methacrylate and stearyl and behenyl acrylates and methacrylates, acrylates and methacrylates carrying an oxyethylenated linkage, such as ethyl triglycol methacrylate, or vinyl monomers, such as vinyl chloride, vinylidene chloride or vinyl acetate.

Mention may be made, among the polar monomers (C), of N,N-dimethylaminoethyl or N-tert-butylamino-ethyl methacrylates and acrylates and their quaternized derivatives, acrylic and methacrylic acids, or monomers carrying a sulphonic acid or hydroxyl group, such as hydroxyethyl or hydroxypropyl acrylates and methacrylates.

Crosslinking agents are generally used to attach the copolymer to the substrate and to render it insoluble in solvents. They are acrylamide derivatives, such as N-methylolacrylamide and N-methylolmethacryl-amide, or chlorohydroxypropyl acrylate or methacrylate.

The surfactants used are anionic or cationic surfactants, such as sulphosuccinate and quaternary ammonium derivatives, for example sodium bis(tridecyl) sulphosuccinate.

They are optionally used in combination with nonionic surfactants.

The molecular masses are adjusted using chain-transfer agents, such as mercaptans, or by the technique for introduction of the monomers. The copolymerization can be initiated at between 20 and 140° C. by means of water-soluble or organosoluble initiators of peroxide type (such as hydrogen peroxide), persalt type (such as persulphates) or azo type, such as 4,4'-azobis(4-cyanopentanoic acid) or azobis(amidinopropane) hydrochloride or azobisisobutyronitrile.

The polymerization is preceded by a stage of emulsification of the mixture comprising the monomers, the water and the surfactants. It is important to carry out this emulsification by energetic emulsifying means, such as ultrasound or homogenizers of the Manton-Gaulin type or a colloidal mill. The mechanical energy contributed by these devices makes it possible to shear the mixture and to form fine monomer droplets stabilized by the surfactant. These fine droplets of monomers are sites of polymerization generating polymer particles with comparable sizes (50–500 nm).

The emulsions of fluorinated polymers according to the invention can be used in the hydrophobic and oleophobic treatment of a great variety of substrates, such as textiles, leather, paper or construction materials. They can be applied, after dilution in water, by padding, steeping, coating or spraying. They can be formulated with various additives, such as fixing resins, catalysts, antistatic agents, antifoaming agents or fungicides.

EXAMPLES

The following examples illustrate the invention without limiting it. Except when otherwise indicated, the parts and percentages are expressed by weight.

Example 1 a) Preparation of the Latex

The following are introduced into a 1000 parts by volume reactor which is heated by a thermostatically controlled jacket and is equipped with an anchor stirrer and a reflux condenser:

480 parts of demineralized water 0.12 part of borax ($Na_2B_2O_5$)

3.99 parts of sodium bis(tridecyl)sulpho-succinate 8.34 parts of a mixture of polyfluorinated acrylates of formula:

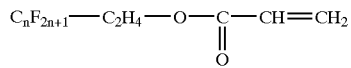

where n is equal to 8, 10, 12 and 14 in respective ratios by weight of 63:25:10:2.

The mixture is brought to 65° C. with stirring for 30 minutes and then subjected to ultrasound (Branson Sonifier) for one minute. The following are added with stirring to this mixture which has been subjected to ultrasound:

58.6 parts of 2-ethylhexyl methacrylate 0.36 part of methacrylic acid 1.26 parts of N-methylolacrylamide 59.8 parts of a mixture of polyfluorinated acrylates of formula:

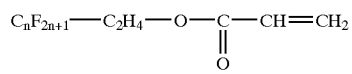

where n is equal to 8, 10, 12 and 14 in respective ratios by weight of 63:25:10:2.

This mixture is subjected to ultrasound (Branson Sonifier) for one minute and then homogenized with a high-pressure homogenizer (Microfluidizer), 6 passes being carried out at 60° C.

The miniemulsion thus obtained is composed of fine droplets of monomers having a mean particle diameter of the order of 100–200 nm. It is transferred into a 1000 parts by volume reactor which is heated by a thermostatically controlled jacket and is equipped with an anchor stirrer and a reflux condenser. This miniemulsion is brought to 88° C. while purging with nitrogen and the polymerization is initiated with 0.84 g of potassium persulphate dissolved in 7 g of water. An equivalent amount of initiator solution is run continuously into the reactor for one hour. The polymerization is continued for an additional hour. The nitrogen purging is maintained throughout the duration of the polymerization.

A coagulum-free perfluorinated copolymer latex is obtained, which copolymer has the following composition by mass: 53.4% of perfluorinated units, 45.8% of 2-ethylhexyl methacrylate, 0.3% of methacrylic acid and 0.47% of N-methylolacrylamide. The solids content is 20% and the mean particle diameter is 130 nm.

b) Application to Leather

The perfluorinated copolymer latex obtained is diluted in water at ambient temperature until an aqueous solution is obtained comprising 1% of active materials.

This solution is subsequently sprayed crosswise onto leather samples using a Volumair T 21 sprayer.

The amount deposited is on average 130 g/m². After drying for 24 hours at ambient temperature, the leather samples are evaluated in the following way:

Oleophobicity Tests

The oleophobicity is measured according to the test described in "AATCC Technical Manual", test method 118 (1992), which evaluates the non-wettability of the substrate by a series of oily liquids of decreasing surface tensions. The grading of the treated substrate is defined as the maximum value of the test liquid which does not wet the substrate. The test liquids employed in the evaluation are listed in the following table:

| Grading | Test liquids for measuring the oleophobicity | Surface tension at 25° C. (mN/m) |
| --- | --- | --- |
| 1 | Nujol | 31.5 |
| 2 | Nujol/n-hexadecane (65/35 by volume) | 29.6 |
| 3 | n-hexadecane | 27.3 |
| 4 | n-tetradecane | 26.4 |
| 5 | n-dodecane | 24.7 |
| 6 | n-decane | 23.5 |
| 7 | n-octane | 21.4 |
| 8 | n-heptane | 19.8 |

Hydrophobicity Tests

The hydrophobic effect is measured using test solutions numbered 1 to 10 and composed of water/isopropanol (IPA) mixtures in the following by weight:

| Test solutions | Water | Isopropanol |
| --- | --- | --- |
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10 | 0 | 100 |

These tests consist in depositing drops of these mixtures on the treated substrates and in then observing the effect produced. The grading is carried out by giving, as the value, the number corresponding to the solution which has not penetrated or wetted the substrate after being in contact for 30 seconds.

In this example, the treated leather samples are lamb skin. The results of this treatment are recorded in the table below:

|  | AATCC 118 | Water/IPA |
| --- | --- | --- |
| Treated | 4 | 5 |
| Untreated | 0 | 0 |

This table shows the notable effectiveness of this product.

Example 2 a) Preparation of the Latex

The following are introduced into a 1000 parts by volume reactor which is heated by a thermostatically controlled jacket and is equipped with an anchor stirrer and a reflux condenser:

480 parts of demineralized water 0.12 part of borax ($Na_2B_2O_5$)

3.99 parts of sodium bis(tridecyl)sulpho-succinate 8.34 parts of a mixture of polyfluorinated acrylates of formula:

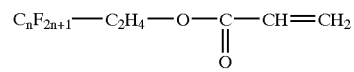

where n is equal to 8, 10, 12 and 14 in respective ratios by weight of 63:25:10:2.

The mixture is brought to 65° C. with stirring for 30 minutes and then subjected to ultrasound (Branson Sonifier) for one minute. The following are added with stirring to this mixture which has been subjected to ultrasound:

28.58 parts of 2-ethylhexyl methacrylate 0.27 part of methacrylic acid 0.95 part of N-methylolacrylamide 90.2 parts of a mixture of polyfluorinated acrylates of formula:

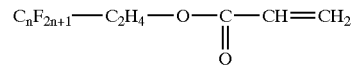

where n is equal to 8, 10, 12 and 14 in respective ratios by weight of 63:25:10:2.

This mixture is subjected to ultrasound (Branson Sonifier) for one minute and then homogenized with a high-pressure homogenizer (Microfluidizer), 6 passes being carried out at 60° C.

The miniemulsion thus obtained is composed of fine droplets of monomers having a mean particle diameter of the order of 100–200 nm. It is transferred into a 1000 parts by volume reactor which is heated by a thermostatically controlled jacket and is equipped with an anchor stirrer and a reflux condenser. This miniemulsion is brought to 88° C. while purging with nitrogen and the polymerization is initiated with 0.84 g of potassium persulphate dissolved in 7 g of water. An equivalent amount of initiator solution is run continuously into the reactor for one hour. The polymerization is continued for an additional hour. The nitrogen purging is maintained throughout the duration of the polymerization.

A coagulum-free perfluorinated copolymer latex is obtained, which copolymer has the following composition by mass: 77.1% of perfluorinated units, 22.4% of 2-ethylhexyl methacrylate, 0.2% of methacrylic acid and 0.4% of N-methylolacrylamide. The solids content is 20% and the mean particle diameter is 120 nm.

b) Application to Leather

With the conditions described in Example 1 being repeated, the results obtained for Example 2 are expressed in the following table:

|  | AATCC 118 | Water/IPA |
|---|---|---|
| Treated | 4 | 4 |
| Untreated | 0 | 0 |

Example 3 a) Preparation of the Latex

The following are introduced into a 1000 parts by volume reactor which is heated by a thermostatically controlled jacket and is equipped with an anchor stirrer and a reflux condenser:

670 parts of demineralized water 13 parts of dicocodimethylammonium chloride 12 parts of a mixture of ethoxylated alkylphenol with an HLB of 15

200 parts of a mixture of polyfluorinated acrylates of formula:

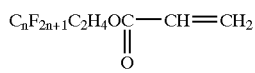

where n is equal to 8, 10, 12 and 14 in respective ratios by weight of 63:25:10:2

65 parts of stearyl methacrylate 8.5 parts of N-methylolacrylamide as a 48% solution in water 9.2 parts of N-methylolmethacrylamide as a 60% solution in water 0.27 part of n-dodecyl mercaptan.

This mixture is brought to 65° C. without stirring for 30 minutes, then subjected to ultrasound (Branson Sonifier) for one minute, then homogenized with a high-pressure homogenizer (Microfluidizer), 6 passes being carried out at 60° C.

The miniemulsion thus obtained is composed of fine droplets of monomers having a mean diameter of the order of 150–200 nm. It is transferred into a 1000 parts by volume reactor which is heated by a thermostatically controlled jacket and is equipped with an anchor stirrer and a reflux condenser. This miniemulsion is brought to 70° C. while purging with nitrogen and the polymerization is initiated with 2.03 parts of azobisisobutyronitrile dissolved in 20 parts of water. The polymerization takes place in two hours.

After cooling, a coagulum-free perfluorinated copolymer latex is obtained, which copolymer has the following composition by mass: 70.7% of perfluorinated units, 23% of stearyl methacrylate, 3% of N-methylol-acrylamide and 3.3% of N-methylolmethacrylamide. The solids content is 33% and is brought to 20% by diluting with water. The mean diameter of the particles is 150 nm.

b) Application to Textiles

A padding bath comprising 25 g/l of the fluorinated copolymer latex obtained above and 1.5 g/l of acetic acid in water is prepared at ambient temperature. The fabrics are subsequently padded in this bath with a degree of expression of the order of 50%. After drying, the fabrics are treated for one minute at 160° C. in a Benz thermal curing device.

The fabrics thus treated are subsequently tested with regard to oleophobicity and hydrophobicity. The oleophobicity is tested according to the AATCC 118 test described above. The hydrophobicity is evaluated according to a test of resistance to wetting by water used to monitor the water-repellent finishing of the fabric (Spray Test according to AATCC Technical Manual, Test Method 22, 1972).

A polyamide (PA) fabric was treated.

The highly advantageous performance of this product is shown in the table below.

|  | AATCC 118 | Spray Test |
|---|---|---|
| PA | 6 | 100 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Process for producing fluorinated polymers in two stages comprising
   a) emulsification of a mixture of monomers comprising:
      from 20 to 99.9% by weight of at least one fluorinated (meth)acrylic monomer (A),
      from 0 to 65% by weight of at least one nonfluorinated acrylic or vinyl monomers (B), and
      from 0.1% to 15% by weight of at least one polar monomer (C),
      using energetic emulsifying treatment, including ultrasound, colloid mill or high-pressure homogenizer to yield fine mixture droplets having a mean diameter of 50–500 nm, and
   b) polymerization of the said mixture at a temperature ranging from 20 to 100° C. using radical initiators,
      the level of organic cosolvent being less than 0/2% by weight of the total weight of the emulsion, and the level of coagulum being less than 1% by weight of the total weight of monomers.

2. Process according to claim 1 wherein the mixture of monomers is stabilized by at least one surfactant selected from the group consisting of nonionic, anionic, and cationic surfactants.

3. Process according to claim 1, wherein the fluorinated monomer A is selected from the group consisting of monomers corresponding to the following formulae:

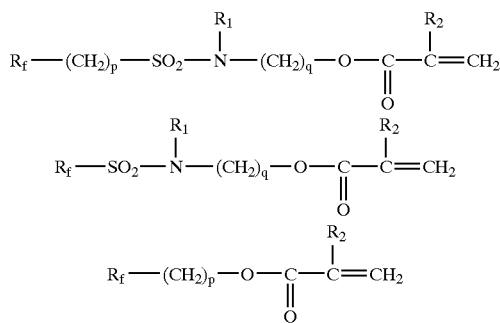

in which $R_f$ represents a perfluorinated radical with a linear or branched chain comprising 2 to 20 carbon atoms, p and q, which are identical or different, each represent an integer ranging from 1 to 20, $R_1$ represents a linear or branched alkyl radical comprising from 1 to 4 carbon atoms and $R_2$ represents a hydrogen atom or a methyl radical.

4. Process according to claim 1, wherein the monomer B is selected from the group consisting of $C_1$–$C_{22}$ alkyl acrylates, $C_1$–$C_{22}$ alkyl (meth)acrylates, acrylates and (meth)acrylates the radical of which carries an oxyethylenated linkage, and vinyl monomers.

5. Process according to claim 1, wherein the initiator is selected from the group consisting of peroxides, persalts, and azo compounds.

6. Aqueous dispersion of fluorinated polymers obtained according to the process of claim 1, the content of organic cosolvent of which is less than 0.2% by weight of the total weight of the emulsion and the level of coagulum being less than 1% by weight of the total weight of the monomers.

7. Hydrophobic and oleophobic treatment of substrates comprising treatment of, leather, textiles, fitted carpets, paper and construction materials with an aqueous dispersion of the polymer of claim 6.

8. Process according to claim 3 wherein the integer is from 1 to 4.

9. Process according to claim 1 wherein the polar monomer (C) is selected from the group consisting of acrylic acid, (meth)acrylic acid, acrylate carrying a sulphonic acid or hydroxy group, (Meth)acrylate carrying a sulphonic acid or hydroxy group, N,N-dimethylaminoethyl acrylates, N,N-(meth)acrylates, N-tert-butylaminoethyl acrylate and N-tert-butylaminoethyl (meth)acrylates.

10. Process according to claim 2 wherein the surfactant is selected from the group consisting of sulphosuccinate compounds or quaternary ammonium compounds.

11. Process according to claim 5 wherein the initiator is selected from the group consisting of persulphates and 4.4'-azobis(4-cyanopentanoic acid).

12. Process according to claim 1 further comprising a crosslinking agent.

* * * * *

UNITED STATES PATENT AND TRADEMARK OFFICE
CERTIFICATE OF CORRECTION

PATENT NO. : 6,774,176 B1 Page 1 of 1
DATED : August 10, 2004
INVENTOR(S) : Denis Tembou Nzudie, Jean-Marc Corpart and Didier Juhue It is certified that error appears in the above-identified patent and that said Letters Patent is hereby corrected as shown below:

<u>Column 10,</u>
Line 21, "N,N-(meth)acrylates," should be -- N,N-dimethylaminoethyl(meth)acrylates, --.

Signed and Sealed this

Sixteenth Day of May, 2006

JON W. DUDAS
*Director of the United States Patent and Trademark Office*